Figure 4:
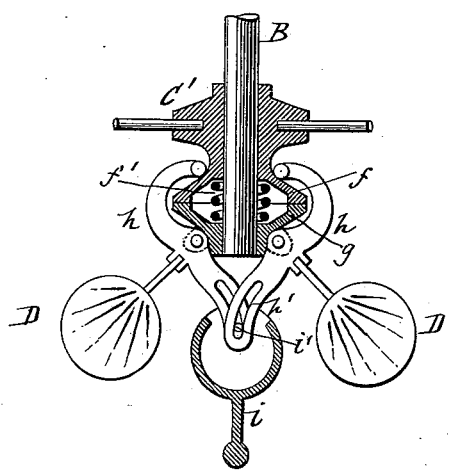

(No Model.) 3 Sheets—Sheet 1.
P. MURRAY, Jr.
AUTOMATIC FAN.
No. 334,717. Patented Jan. 19, 1886.
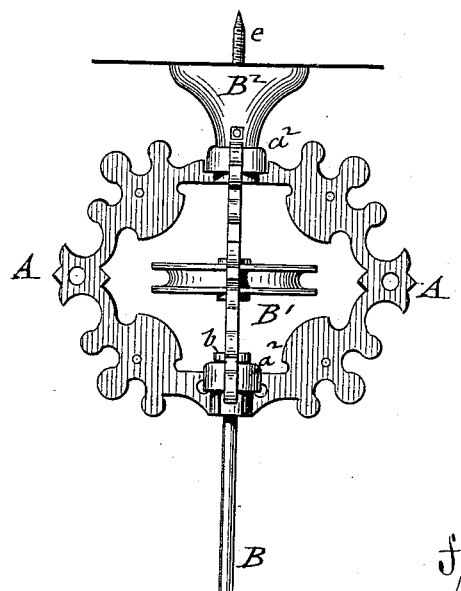
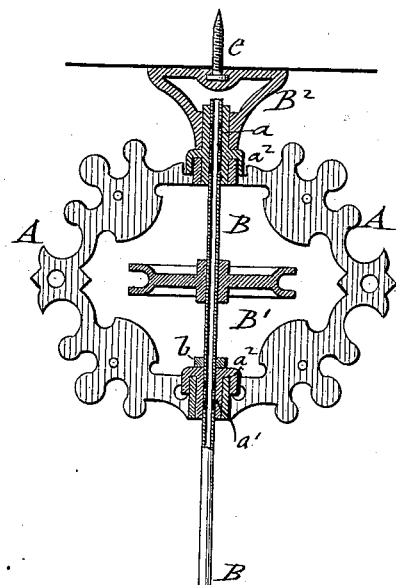
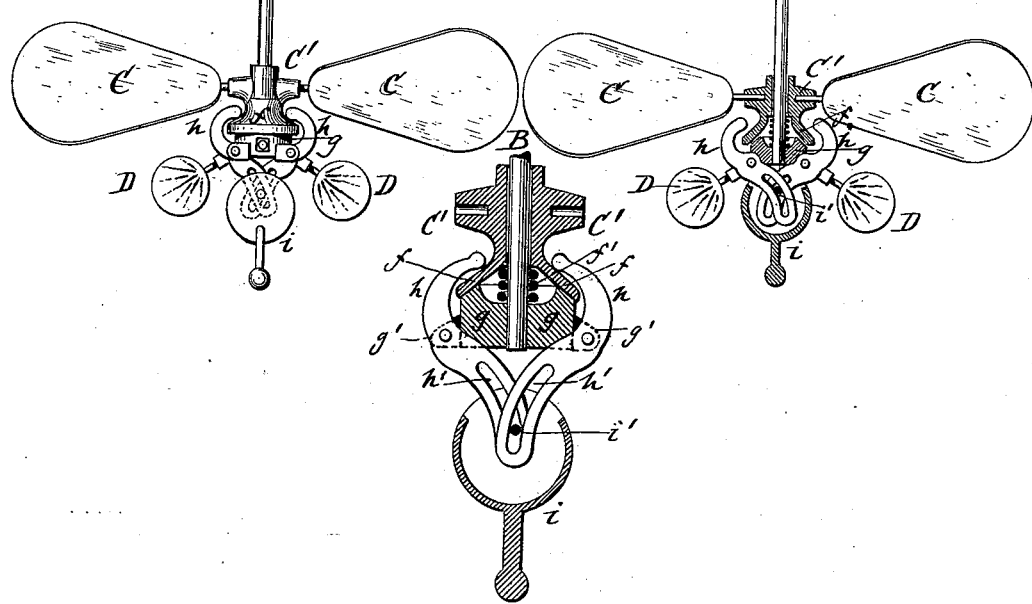
WITNESSES
INVENTOR (No Model.)  P. MURRAY, Jr.  3 Sheets—Sheet 2.
AUTOMATIC FAN.

No. 334,717.  Patented Jan. 19, 1886.

WITNESSES
Jos. N. Rosenbaum.
Ernst Wolff.

INVENTOR
Peter Murray jr
By his Attorneys
Goepel & Raegener (No Model.) 3 Sheets—Sheet 3.

P. MURRAY, Jr.
AUTOMATIC FAN.

No. 334,717. Patented Jan. 19, 1886.

WITNESSES:

INVENTOR
Peter Murray Jr.
BY
Goepel & Raegener
ATTORNEYS.

UNITED STATES PATENT OFFICE.

PETER MURRAY, JR., OF NEWARK, ASSIGNOR TO HIMSELF, RICHARD S. T. CISSEL, AND ROBERT B. CISSEL, OF ELIZABETH, AND ALFRED N. LEWIS, OF NEWARK, NEW JERSEY.

AUTOMATIC FAN.

SPECIFICATION forming part of Letters Patent No. 334,717, dated January 19, 1886.

Application filed August 1, 1885. Serial No. 173,216. (No model.)

*To all whom it may concern:*

Be it known that I, PETER MURRAY, Jr., of Newark, in the county of Essex and State of New Jersey, have invented certain new and useful Improvements in Automatic Fans, of which the following is a specification.

This invention relates to rotary fans and fan-hangers suspended from the ceiling or projecting from the walls of restaurants, offices, counting-rooms, &c., so as to agitate the air in warm weather, and has for its object to simplify the construction and adjustment of these rotary fans and give to them a more attractive and artistic appearance.

Heretofore such fans have been connected in series with a main driving or counter shaft by belts or cords, so as to revolve when the shaft is in motion. When it is desirable to run only a part of the fans, it has been customary to throw off the belt, or to provide a tight and a loose pulley or a clutch mechanism upon the main or counter shaft, which devices add greatly to the expense, and which are, owing to their machinery appearance, objectionable in offices, &c. To remove these objections the shaft and hub of the fan are so arranged as to permit the ready engagement of the fan with or the release of the same from the fan-shaft.

The invention consists of a fan-shaft that turns in bearings of a sectional hanger attached to the ceiling or wall by means of an enlarged base, the hanger being made of several sections, that are united by flanged journal-bearings and a collar of soft metal. The hub of the fan is placed loosely on the lower end of the fan-shaft and provided with a flange, that forms frictional contact with a fixed collar, said flange being acted upon by fulcrumed clutch-levers having arc-shaped slots in their lower ends, which are engaged by a transverse pin or stud of the handle, by means of which the friction-clutch formed by the hub and collar are thrown in or out of gear. Auxiliary fans are attached to the clutch-levers and rotated therewith to agitate the air sufficiently to keep away the flies.

The invention consists, further, of certain details of construction and combination of parts, which will be more fully described hereinafter, and finally pointed out in the claims.

Figure 8:
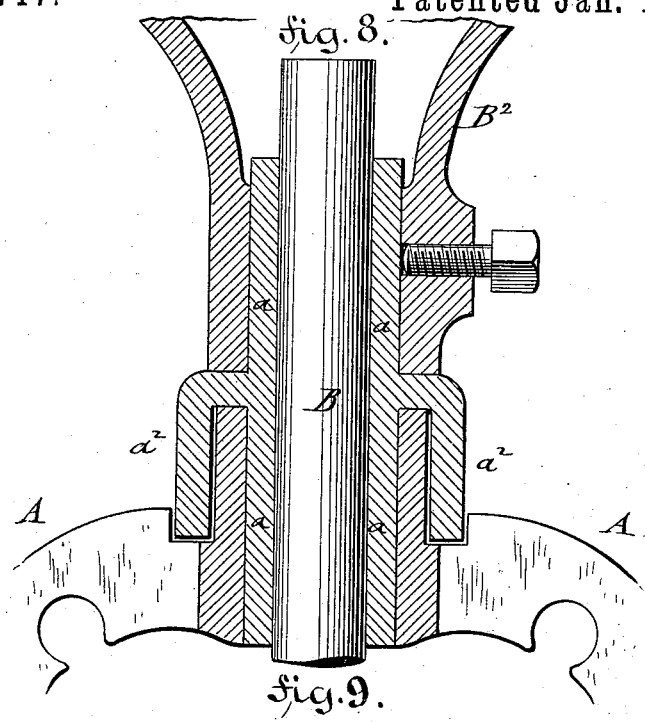
Figure 9:
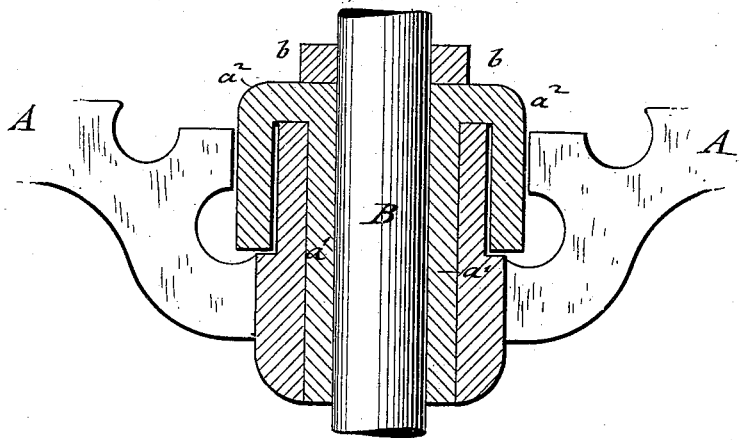
Figure 10:
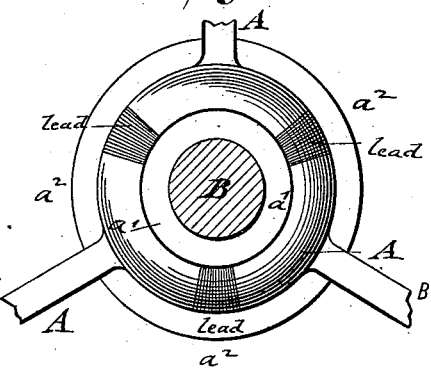

In the accompanying drawings, Figure 1 represents a side elevation of my improved automatic fan. Fig. 2 is a vertical central section of the same; Fig. 3, a vertical central section of the friction-clutch drawn on a larger scale, and showing the fan-hub thrown into gear with the fan-shaft. Figs. 4, 5, 6, and 7 are vertical transverse sections showing different modified constructions of the friction-clutch; and Figs. 8, 9, and 10 are respectively detail sections and a bottom view of the socket-connections of the hanger and journal-bearings of the fan-shaft.

Similar letters of reference indicate corresponding parts.

A in the drawings represents a fan-hanger; B, a vertical fan-shaft; B', a pulley keyed to the upper part of the fan-shaft, and C the fan, the blades of which are secured by short shanks to the fan-hub C', which is made to slide loosely on the lower end of the fan-shaft B. The fan-hanger A is made of several sections, that are connected at their upper and lower ends by the journal-bearings $a$ $a'$ of the fan-shaft B, said journal-bearings having exterior flanges, that form sockets $a^2$ for the ends of the hanger-sections, as shown in Figs. 2, 8, and 9. The ends of the hanger-sections A are attached to the sockets of the journal-bearings by means of lead or other suitable soft metal, that is run into the interior of said sockets, as shown in Fig. 10, so as to unite the hangers and bearings without the use of bolts and screws, which would have a tendency to impair the ornamental appearance of the hanger. The fan-shaft B rests by a collar, $b$, on the bearing $a'$ at the lower end of the hanger A, while the upper end turns in the journal-bearing $a$, that is secured to a socket of the enlarged base $B^2$. The base $B^2$ is attached by a screw, $e$, which is secured by casting or otherwise to the base $B^2$, and screwed in line with the fan-shaft to the ceiling or wall. The large base B² serves as a steady support for the hanger, so as to prevent the shaking or vibrating of the fan-shaft. The fan-shaft B is made tubular at its upper part, the tubular part serving as an oil-reservoir for lubricating the bearings, which is accomplished by providing the shaft within the bearings $a\ a'$ with small holes and plugs of soft wood or fibrous material, (not shown in the drawings,) whereby the oil is fed to the bearings as required. The fan-shaft B is provided at its lower end with a fixed collar, $g$, having a beveled circumference. Immediately above the collar $g$ is arranged the fan C, the hub C' of which slides loosely on the shaft B, and is provided with an outwardly-flaring flange, $f$, at its lower part, which flange bears on the beveled face of the collar $g$. A spiral spring, $f'$, is interposed between the hub C' and the collar $g$, so as to raise the fan and interrupt the frictional contact between the flange $f$ and the face of the collar $g$. The fixed collar $g$ is provided with projecting lugs or ears $g'\ g'$, to which are fulcrumed two clutch or gripping levers, $h\ h$, that engage by their curved upper ends the flange $f$ of the hub C', while their lower ends are provided with arc-shaped slots $h'\ h'$, through which is passed the transverse pin $i'$ of the handle $i$, by means of which the friction-clutch formed by the flange $f$, collar $g$, and fulcrumed levers $h\ h$ is operated.

To sockets of the clutch-levers $h\ h$ are secured small auxiliary fans or flags D D, which rotate continuously with the fan-shaft independently of the fan C, said auxiliary fans serving to agitate the air, and preventing thereby the flies from alighting on the desk or other object above which the fan is arranged. By pulling the handle $i$ in downward direction, the clutch-levers $h\ h$ are operated by the action of the transverse pin $i'$ on the slots at the lower parts of the levers, so that their upper ends grip the flange $f$ of the hub C', and move the latter in downward direction against the tension of the spiral spring $f'$, whereby the flange $f$ forms frictional contact with the collar $g$, and causes the fan to rotate with the fan-shaft. By moving the handle in upward direction the clutch-levers $h\ h$ are released from the hub of the fan-shaft, so that the hub is acted upon by the spiral spring $f'$, and thereby the frictional contact between the hub C' and collar $g$ interrupted. The fan C, however, is not brought entirely to rest, but continues to rotate slowly, as there is some friction between its hub and the fan-shaft.

Figure 5:
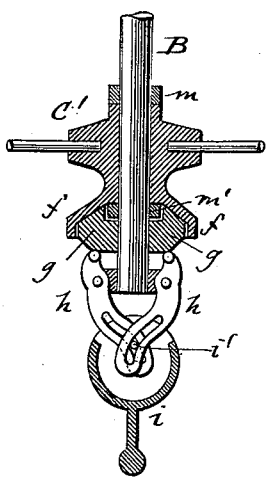
Figure 6:
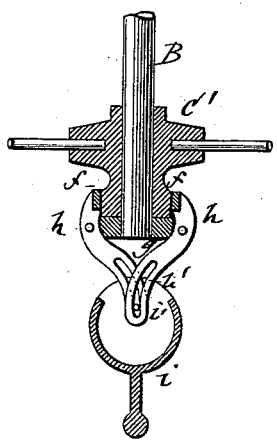

In place of the clutch shown in Figs. 1, 2, and 3, other friction devices may be used, as shown in Figs. 4, 5, 6, and 7. In Fig. 4 the flange $f$ forms contact at its circumference with the circumference of a cup-shaped collar, $g$, while in Fig. 5 the fan-hub C' is retained on the fan-shaft B by two collars, $m\ m'$, while the collar $g$ is arranged to slide on the fan-shaft by the action of the clutch-levers $h\ h$, so as to be brought into frictional contact with the flange $f$. The clutch-levers are in this case fulcrumed to a collar at the lower end of the fan-shaft C. In Fig. 6 the clutch-levers are provided with friction-surfaces, which are applied to the circumference of the hub by the clutch-levers, while in Fig. 7 the hub is again retained by collars $m\ m'$, and the flange $f$ of the same placed into frictional contact with frictional surfaces at the upper end of the levers $h\ h$, which are in this case fulcrumed to a collar at the lower end of the fan-shaft and operated by two transverse pins of the handle $i$.

Figure 7:
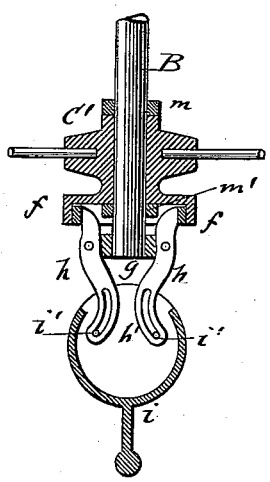

In the clutches shown in Figs. 5, 6, and 7 the spiral lifting-spring may be dispensed with, as the friction-surfaces are thrown into contact or separated without the aid of the same.

Having thus described my invention, I claim as new and desire to secure by Letters Patent—

1. The combination, with a rotating fan-shaft, of a fan having a hub applied loosely to the shaft, and a friction-clutch for throwing the hub in or out of gear with the fan-shaft, substantially as set forth.

2. The combination of a rotating fan-shaft, a fan having a hub applied loosely to said shaft, said hub having an annular flange, a collar keyed to the lower end of the fan-shaft, a spiral spring interposed between said collar and the fan-hub, friction-levers fulcrumed to the collar, and a handle by which the levers are operated and the hub thrown in or out of contact with the collar, substantially as set forth.

3. The combination of a rotating fan-shaft, a fan having a hub placed loosely on said fan-shaft, said hub having an annular flange, a collar keyed to the lower end of the fan-shaft, clutch-levers fulcrumed to said collar, and a handle having a transverse pin passing through slots of said levers, substantially as set forth.

4. The combination of a rotating fan-shaft, a fan having a hub placed loosely thereon, said hub having an annular flange at the lower part, a collar keyed to the lower end of the shaft, a spiral spring interposed between the hub and collar, fulcrumed clutch-levers having slots at their lower ends, and a handle engaging the slotted ends of the clutch-levers, so as to throw the hub in or out of contact with the friction-collar, substantially as set forth.

5. The combination of a rotating fan-shaft, a fan having a hub placed loosely on said shaft, a friction-clutch for throwing the hub in or out of gear with the rotating fan-shaft, and auxiliary fans attached to the fan-shaft below the main fan, substantially as set forth.

6. The combination of a rotating fan-shaft, a hanger made of sections, and journal-bearings for supporting the fan-shaft, said journal-bearings having annular flanges for locking the ends of the hanger-sections, substantially as set forth.

7. The combination of a rotating fan-shaft, a hanger made of several sections, journal-bearings having annular flanges for locking the ends of said hanger-sections, and an enlarged base having a fixed center screw, substantially as set forth.

In testimony that I claim the foregoing as my invention I have signed my name in presence of two subscribing witnesses.

PETER MURRAY, JR.

Witnesses:
SIDNEY MANN,
MARTIN PETRY.